United States Patent Office 3,761,426
Patented Sept. 25, 1973

3,761,426
BIMETALLIC CATALYTIC COMPOSITE
Frederick C. Wilhelm, Arlington Heights, Ill., assignor to Universal Oil Products Company, Des Plaines, Ill.
No Drawing. Continuation-in-part of abandoned application Ser. No. 835,218, June 20, 1969. This application June 16, 1971, Ser. No. 153,870
Int. Cl. B01j 11/74
U.S. Cl. 252—439
10 Claims

ABSTRACT OF THE DISCLOSURE

A catalytic composite comprising a combination of a platinum component, a lead component and a halogen component with a porous carrier material is disclosed. The platinum and halogen components are present in the composite in amounts, calculated on an elemental basis, of about 0.01 to about 2 wt. percent platinum and about 0.1 to about 3.5 wt. percent halogen, and the lead component is present in an atomic ratio to the platinum component of about 0.05:1 to about 0.9:1. Moreover, both the platinum component and the lead component are uniformly dispersed throughout the porous carrier material, and substantially all of the platinum is present as the elemental metal and substantially all of the lead is present in an oxidation state above that of the elemental metal. The principal utility of the subject composite is in the conversion of hydrocarbons, particularly in the reforming of a gasoline fraction. A specific example of the catalyst disclosed is a combination of a platinum metal component, a lead oxide component and a halogen component with an alumina carrier material wherein the platinum and lead components are uniformly dispersed throughout the carrier material and wherein the composite contains 0.01 to 2 wt. percent platinum, 0.1 to 3.5 wt. percent halogen, and an atomic ratio of lead to platinum of 0.05:1 to 0.9:1.

CROSS-REFERENCES TO RELATED APPLICATIONS

This application is a continuation-in-part of my prior, copending application Ser. No. 835,218 which was filed on June 20, 1969, now abandoned.

DISCLOSURE

The subject of the present invention is a novel, bimetallic catalytic composite which has exceptional activity, selectivity, and resistance to deactivation when employed in a hydrocarbon conversion process that requires a catalyst having both a hydrogenation-dehydrogenation function and an acid function. More precisely, the present invention involves a novel, bimetallic dual-function catalytic composite which utilizes a catalytic component, lead, which traditionally has been thought of and taught to be a poison for a platinum group metal, to interact with a platinum-containing catalyst to enable substantial improvements in hydrocarbon conversion processes of the type that have traditionally utilized platinum metal-containing catalysts to accelerate the various hydrocarbon conversion reactions associated therewith. In another aspect this invention concerns the improved processes that are produced by the use of a catalytic composite comprising a combination of a platinum component and a lead component with a porous, high surface area carrier material in a manner such that the components are uniformly dispersed throughout the porous carrier material, their oxidation states are carefully controlled and the amount of the platinum component is substantially greater than the amount of the lead component on an atomic basis. In a specific aspect, the present invention concerns an improved reforming process which utilizes the disclosed bimetallic catalyst to markedly improve activity, selectivity, and stability characteristics associated therewith, to increase yields of $C_5^+$ reformate and of hydrogen recovered therefrom and to allow operation thereof at high severity conditions not heretofore generally employed in the art of continuous reforming processes.

Composites having a hydrogenation-dehydrogenation function and a cracking function are widely used today as catalysts in many industries, such as the petroleum and petrochemical industry, to accelerate a wide spectrum of hydrocarbon conversion reactions. Generally, the cracking function is thought to be associated with an acid-acting material of the porous adsorptive, refractory oxide type which is typically utilized as the support or carrier for a heavy metal component such as the metals or compounds of metals of Groups V through VIII of the Periodic Table to which are generally attributed the hydrogenation-dehydrogenation function.

These catalytic composites are used to accelerate a wide vareity of hydrocarbon conversion reactions such as hydrocracking, isomerization, dehydrogenation, hydrogenation, desulfurization, cyclization, alkylation, polymerization, cracking, hydroisomerization, etc. In many cases, the commercial applications of these catalysts are in processes where more than one of these reactions are proceeding simultaneously. An example of this type of process is reforming wherein a hydrocarbon feed stream containing paraffins and naphthenes is subjected to conditions which promote dehydrogenation of naphthenes to aromatics, dehydrocyclization of paraffins to aromatics, isomerization of paraffins and naphthenes, hydrocracking of naphthenes and paraffins, and the like reactions to produce an octane-rich or aromatic-rich product stream. Another example is a hydrocracking process wherein catalysts of this type are utilized to effect selective hydrogenation and cracking of high molecular weight unsaturated materials, selective hydrocracking of high molecular weight materials, and other like reactions, to produce a generally lower boiling, more valuable output stream. Yet another example is an isomerization process wherein a hydrocarbon fraction which is relatively rich in straight-chain paraffin compounds is contacted with a dual-function catalyst to produce an output stream rich in isoparaffin compounds.

Regardless of the reaction involved or the particular process involved, it is of critical importance that the dual-function catalyst exhibit not only the capability to initially perform its specified functions but also that it has the capability to perform them satisfactorily for prolonged periods of time. The analytical terms used in the art to measure how well a particular catalyst performs its intended functions in a particular hydrocarbon reaction environment are activity, selectivity, and stability. And for purposes of discussion here these terms are conveniently defined for a given charge stock as follows: (1) activity is a measure of the catalyst's ability to convert hydrocarbon reactants into products at a specified severity level where severity level means the conditions used—that is, the temperature, pressure, contact time, and presence of diluents such as $H_2$; (2) selectivity refers to the amount of desired product or products obtained relative to the amount of reactants converted or charged; (3) stability refers to the rate of change with time of the activity and selectivity parameters—obviously, the smaller rate implying the more stable catalyst. In a reforming process, for example, activity commonly refers to the amount of conversion that takes place for a given charge stock at a specified severity level and is typically measured by octane number of the $C_5^+$ product stream; selectivity usually refers to the relative amount of $C_5^+$ yield that is obtained at the particular severity level; and stability is typically equated to the rate of change with time of activity, as measured by octane number of $C_5^+$ product and of selectivity, as measured by $C_5^+$ yield. Actually, the last statement is not strictly correct because generally a continuous reforming process is run to produce a constant octane $C_5^+$ product with a severity level being continuously adjusted to attain this result; and, furthermore, the severity level is for this process usually varied by adjusting the conversion temperature in the reaction zone so that, in point of fact, the rate of change of activity finds response in the rate of change of conversion temperatures and changes in this last parameter are customarily taken as indicative of activity stability.

As is well known to those skilled in the art, the principal cause of observed deactivation or instability of a dual-function catalyst when it is used in a hydrocarbon conversion reaction is associated with the fact that coke forms on the surface of the catalyst during the course of the reaction. More specifically, in these hydrocarbon conversion processes, the conditions utilized typically result in the formation of heavy, high molecular weight, black, solid or semi-solid, carbonaceous material which coats the surface of the catalyst and reduces its activity by shielding its active sites from the reactants. In other words, the performance of this dual-function catalys is sensitive to the presence of carbonaceous deposits on the surface of the catalyst. Accordingly, the major problem facing workers in this area of the art is the development of more active and selective catalytic composites that are not as sensitive to the presence of these carbonaceous materials and/or have the capability to suppress the rate of formation of these carbonaceous materials on the catalyst. Viewed in terms of performance parameters, the problem is to develop a dual-function catalyst having superior activity, selectivity, and stability. In particular, for a reforming process the problem is typically expressed in terms of shifting and stabilizing the $C_5^+$ yield-octane relationship—$C_5^+$ yield being representative of selectivity and octane being proportional to activity.

I have now found a dual-function, bimetallic catalytic composite which possesses improved activity, selectivity, and stability when it is employed in a process for the conversion of hydrocarbons of the type which have heretofore utilized dual-function catalytic composites such as processes for isomerization, hydroisomerization, dehydrogenation, desulfurization, denitrogenization, hydrogenation, alkylation, dealkylation, disproportionation, oligomerization, hydrodealkylation, transalkylation, cyclization, dehydrocyclization, cracking, hydrocracking, reforming, and the like processes. In particular, I have ascertained that the use of a catalytic composite comprising a combination of a platinum component, a halogen component and a lead component with a porous refractory carrier material can enable the performance of a hydrocarbon conversion process which has traditionally utilized a dual-function catalyst to be substantially improved, provided the amounts of the metallic components, their oxidation states and the distribution thereof in the catalytic composite are carefully controlled in the manner indicated herein. Since the earliest introduction of catalysts containing a platinum component, it has been axiomatic that the effect of lead on a platinum-containing catalyst is detrimental. This concept has become so fixed and certain in the art that tremendous efforts have been devoted to removing lead contaminants from charge stocks that are to be processed in a unit containing a platinum catalyst. In addition, the art is replete with the significant number of methods for reactivating a platinum-containing catalyst once it has been deactivated by contact with lead or compounds of lead. In sharp contrast to this historic teaching of the art that lead is detrimental to a platinum-containing catalyst, I have now discovered that the presence of lead in a platinum composite can be very beneficial under certain conditions. One essential condition associated with the acquisition of the beneficial interaction of lead with platinum is the atomic ratio of lead to platinum metal contained in the composite; my findings here indicate that it is only when this ratio is less than 1:1 that the beneficial interaction of lead with platinum is obtained. Another condition for achieving a beneficial interaction of lead with platinum is the distribution of both the lead and platinum components in the carrier material with which they are combined; my finding here is that it is essential that both of these components be uniformly dispersed throughout the porous carrier material. Yet another condition is associated with the oxidation state of the metallic components in the finished catalyst; my finding here is that best results are obtained when substantially all of the platinum component is present as the elemental metal and when substantially all of the lead component is present in an oxidation state above that of the elemental metal. A catalyst meeting these essential limitations differs sharply from the lead-contaminated catalyst of the prior art. The prime reason for this is that the lead-contaminated catalyst inevitably possesses a high concentration of lead on the surface thereof since the lead component is acquired from contact with the charge stock typically containing an organic or inorganic lead contaminant, and the atomic ratio of lead to platinum in the resulting catalyst varies from an unacceptably high amount on the surface to negligibly low amount on the interior portion of the composite.

In the case of a reforming process, one of the principal advantages associated with the use of this novel bimetallic catalyst involves the acquistion of the capability to operate in a stable manner in a high severity operation; for example, a continuous reforming process producing a $C_5^+$ reformate having an octane of about 100 F-1 clear and utilizing a relatively low pressure of 50 to about 350 p.s.i.g. In this latter embodiment the principal effect of the lead component is to stabilize the platinum component by providing a mechanism for allowing it to better resist the rather severe deactivation normally associated with these conditions. In short, the present invention essentially involves the finding that the addition of a controlled amount of a lead component to a dual-function hydrocarbon conversion catalyst containing a platinum component coupled with the uniform distribution of the lead component throughout the catalytic composite to achieve an atomic ratio of lead to platinum of less than 1:1 and with careful control of the oxidation states of the metallic components, enables the performance characteristics of the catalyst to be sharply and materially improved.

It is, accordingly, one object of the present invention to provide a hydrocarbon conversion catalyst having superior performance characteristics when utilized in a hydrocarbon conversion process. A second object is to provide a bimetallic catalyst having dual-function hydrocarbon conversion performance characteristics that are relatively insensitive to the deposition of hydrocarbonaceous material thereon. A third object is to provide preferred methods of preparation of this catalytic composite which insures the achievement and maintenance of its properties. Another object is to provide an improved reforming catalyst having superior activity, selectivity, and stability when employed in a low pressure reforming process. Yet another object is to provide a dual-function hydrocarbon conversion catalyst which utilizes a relatively inexpensive component, lead, to promote and stabilize a platinum metal component. Still another object is to provide a method of preparation of a lead-platinum catalyst which insures the lead component is in a highly dispersed state during use in the conversion of hydrocarbons.

In one embodiment, the present invention is a catalytic composite comprising a combination of a platinum component, a halogen component, and a lead component with a porous carrier material. The platinum and halogen components are present in this composite in amounts sufficient to result in the composite containing, on an elemental basis, about 0.01 to about 2 wt. percent of platinum and about 0.1 to about 3.5 wt. percent halogen. Likewise, the lead component is present in an amount sufficient to result in an atomic ratio to the platinum metal of about 0.05:1 to about 0.9:1. Furthermore, both metallic components are uniformly distributed throughout the porous carrier material and their oxidation states are carefully adjusted to result in a composite having substantially all of the platinum component present as the elemental metal and substantially all of the lead component present in an oxidation state above that of the elemental metal.

A second embodiment involves a catalytic composite comprising a platinum group component, a lead component, and a halogen component with an alumina carrier material. The components are present in amounts sufficient to result in the composite containing, on an elemental basis, about 0.01 to about 2 wt. percent of the platinum group metal and about 0.1 to about 3.5 wt. percent halogen, and having an atomic ratio of lead to platinum group metal of about 0.05:1 to about 0.9:1. Moreover, the platinum component and the lead component are uniformly distributed throughout the alumina carrier material and the oxidation states of the metallic components are adjusted as specified above in the first embodiment.

A third embodiment relates to a catalytic composite comprising a combination of the catalytic composite defined above in the first embodiment with a sulfur component in an amount sufficient to incorporate about 0.05 to about 0.5 wt. percent sulfur, calculated on an elemental sulfur basis.

Another embodiment is a catalyst as defined in the first embodiment above wherein the halogen component is chlorine or a compound of chlorine.

Yet another embodiment involves a catalyst as defined above in the first embodiment with the additional qualification that the lead component is lead oxide.

Other objects and embodiments of the present invention relate to additional details regarding preferred catalytic ingredients, amounts of ingredients, suitable methods of composite preparation, operating conditions for use in the hydrocarbon conversion processes, and the like particulars. These are hereinafter given the following detailed discussion of each of these facets of the present invention.

The bimetallic catalyst of the present invention comprises a porous carrier material of support having combined therewith catalytically effective amounts of a platinum component, a lead component and a halogen component. Considering first the porous carrier material utilized in the present invention, it is preferred that the material be a porous, adsorptive, high surface area support having a surface area of about 25 to about 500 m.²/g. The porous carrier material should be relatively refractory to the conditions utilized in the hydrocarbon conversion process, and it is intended to include within the scope of the present invention carrier materials which have traditionally been utilized in dual-function hydrocarbon conversion catalysts such as: (1) activated carbon, coke, or charcoal; (2) silica or silica gel, clays and silicates including those synthetically prepared and naturally occuring, which may or may not be acid treated; for example, attapulgus clay, china clay, diatomaceous earth, fuller's earth, kaolin, kieselguhr, pumice, etc.; (3) ceramics, porcelain, crushed firebrick, and bauxite; (4) refractory inorganic oxides such as alumina, titanium, dioxide, zirconium dioxide, chromium oxide, zinc oxide, magnesa, thoria, boria, silica-alumina, silica-magnesia, chromia-alumina, alumina-boria, silica-zirconia, etc.; (5) crystalline aluminosilicates such as naturally occurring or synthetically prepared mordenite and/or faujasite, either in the hydrogen form or in a form which has been treated with multi-valent cations; and (6) combinations of one or more elements from one or more of these groups. The preferred porous carrier materials for use in the present invention are refractory inorganic oxides, with best results obtained with an alumina carrier material. Suitable alumina materials are the crystalline aluminas known as the gamma-, eta, and theta-alumina with gamma- and eta-alumina giving best results. In addition, in some embodiments the alumina carrier material may contain minor proportions of other well known refractory inorganic oxides such as silica, zirconia, magnesia, etc.; however, the preferred carrier material is substantially pure gamma- or eta-alumina. Preferred carrier materials have an apparent bulk density of about 0.3 to about 0.7 g./cc. and surface area characteristics such that the average pore diameter is about 20 to 300 angstroms, the pore volume is about 0.1 to about 1 ml./g. and the surface area is about 100 to about 500 m.²/g. In general, best results are typically obtained with a gamma-alumina carrier material which is used in the form of spherical particles having: a relatively small diameter (i.e., typically about $1/16$ inch), an apparent bulk density of about 0.5 g./cc., a pore volume of about 0.4 ml./g., and a surface area of about 175 m.²/g.

The preferred alumina carrier material may be prepared in any suitable manner and may be synthetically prepared or natural occurring. Whatever type of alumina is employed it may be activated prior to use by one or more treatments including drying, calcination, steaming, etc., and it may be in a form known as activated alumina, activated alumina of commerce, porous alumina, alumina gel, etc. For example, the alumina carrier may be prepared by adding a suitable alkaline reagent, such as ammonium hydroxide, to a salt of aluminum such as aluminum chloride, aluminum nitrate, etc., in an amount to form an aluminum hydroxide gel which upon drying and calcining is converted to alumina. The alumina may be formed in any desired shape such as spheres, pills, cakes, extrudates, powders, granules, etc., and utilized in any desired size. For the purpose of the present invention, a particularly preferred form of alumina is the sphere; and alumina spheres may be continuously manufactured by the well-known oil drop method which comprises: forming an alumina hydrosol by any of the techniques taught in the art and preferably by reacting aluminum metal with hydrochloric acid, combining the hydrosol with a suitable gelling agent and dropping the resultant mixture into an oil bath maintained at elevated temperatures. The droplets of the mixture remain in the oil bath until they set and form hydrogel spheres. The spheres are then continuously withdrawn from the oil bath and typically subjected to specific aging treatments in oil and an ammoniacal solution to further improve their physical characteristics. The resulting aged and gelled particles are then washed and dried at a relatively low temperature of about 300° F. to about 400° F. and subjected to a calcination procedure at a temperature of about 850° F. to about 1300° F. for a period of about 1 to about 20 hours. This treatment effects conversion of the alumina hydrogel to the corresponding crystalline gamma-alumina. See the teachings of U.S. Pat. No. 2,620,314 for additional details.

One essential constituent of the composite of the present invention is a lead component and it is an essential feature of the present invention that substantially all of the lead component in the composite in an oxidation state above that of the elemental metal. That is, it is believed that best results are obtained when substantially all of the lead component exists in the catalytic composite in the +2 or +4 oxidation state. Accordingly, the lead component will be present in the composite as a chemical compound such as the oxide, sulfide, halide, etc., or in chemical combination with the carrier material, wherein the lead component is in a positive oxidation state. The preferred method of preparation of the catalytic composite of the present invention which is specifically described in Example I is believed to result in the composite containing substantially all of the lead component in an oxidation state above that of the elemental metal. It is important to note that this limitation on the oxidation state of the lead component requires extreme care in the preparation and use of the composite to insure it is not subjected to reaction conditions which are severe enough to reduce the uniformly dispersed lead component to the metal. The lead component may be incorporated into the catalytic composite in any suitable manner known to effectively disperse this component throughout the carrier material or to result in this condition. Thus, this incorporation may be accomplished by coprecipitation or cogellation with the porous carrier material, ion-exchange with the carrier material while it is in a gel state, or impregnation of the carrier material at any stage in its preparation. It is to be noted that it is intended to include within the scope of the present invention all conventional methods for incorporating a metallic component in a catalyst composite which results in a uniform distribution of the lead component throughout the associated carrier material. One preferred method of incorporating the lead component to the catalytic composite involves coprecipitating the lead component during the preparation of the preferred refractory oxide carrier material, alumina. Typically, this involves the addition of a suitable, soluble, decomposable lead compound to the alumina hydrosol, and then combining the hydrosol with a suitable gelling agent and dropping the resulting mixture into an oil bath as explained in detail hereinbefore. After drying and calcining the resulting gelled carrier material, there is obtained an intimate combination of alumina and lead oxide, which combination has the lead component uniformly dispersed throughout the alumina. Another preferred method of incorporating the lead component into the catalytic composite involves the utilization of a soluble, decomposable compound of lead to impregnate the porous carrier material. In general, the solvent used in this preferred impregnation step is selected on the basis of its capability to dissolve the desired lead compound and is typically an aqueous solution. Hence, the lead component may be added to the carrier material by commingling the latter with an aqueous solution of a suitable lead salt or water-soluble compound of lead such as lead acetate, lead basic acetate, lead bromate, lead bromide, lead chlorate, lead perchlorate, lead chloride, lead citrate, lead ethylsulfate, lead formate, lead nitrate, lead basic nitrate, lead nitrite, and the like compounds. Best results are ordinarily obtained with a solution of lead nitrate and nitric acid. In general, the lead component can be impregnated either prior to, simultaneously with, or after the platinum component is added to the carrier material. However, I have obtained excellent results by impregnating the lead component simultaneously with the platinum component. In fact, I have determined that a preferred impregnation solution contains chloroplatinic acid, nitric acid, and lead nitrate. Best results are believed to be obtained when the lead component is present as lead oxide.

Regardless of which lead compound is used in the preferred impregnation step, it is important that the lead component be uniformly distributed throughout the carrier material. In order to achieve this objective it is necessary to maintain the pH of the impregnation solution in a range of about 1 to about 7, and preferably about 1 to about 3, and to dilute the solution to a volume which approximates the volume of the carrier material which is impregnated. It is preferred to use a volume ratio of impregnation solution to carrier material of at least 0.5:1 to about 2:1 to about 3:1 or more. Similarly, a relatively long contact time should be used during this impregnation step ranging from about 0.25 hour up to about 0.5 hour or more. The carrier material is likewise preferably constantly agitated during this impregnation step.

Another essential ingredient of the present bimetallic catalyst is a platinum component. It is an essential feature of the instant catalyst that substantially all of the platinum component is present therein as the elemental metal, and the hereinafter described reduction step is specifically designed this condition without affecting the oxidation state of the lead component. Generally, the amount of the platinum component present in the final catalyst composite is small compared to the quantities of the other components combined therewith. In fact, the platinum component generally comprises about 0.01 to about 2 wt. percent of the final catalytic composite, calculated on an elemental basis. Excellent results are obtained when the catalyst contains about 0.05 to about 1 wt. percent of platinum metal. The platinum component may be incorporated in the catalytic composite in any suitable manner such as coprecipitation or cogellation with the preferred carrier material, or ion-exchange or impregnation thereof. The preferred method of preparing the catalyst involves the utilization of a water-soluble, decomposable compound of a platinum to impregnate the carrier material. Thus, the platinum component may be added to the carrier by commingling the latter with an aqueous solution of the chloroplatinic acid. Other water-soluble compounds of platinum may be employed in impregnation solutions and include ammonium chloroplatinate, bromoplatinic acid, platinum dichloride, platinum tetrachloride hydrate, platinum dichlorocarbonyldichloride, dinitrodiaminoplatinum, etc. The utilization of a platinum chloride compound such as chloroplatinic acid is preferred since it facilitates the incorporation of both the platinum component and at least a minor quantity of the halogen component in a single step. Hydrogen chloride, nitric acid, or the like acid is also generally added to the impregnation solution in order to further facilitate the incorporation of the halogen component and to aid in the distribution of the platinum component throughout the carrier material. In addition, it is generally preferred to impregnate the carrier material after it has been calcined in order to minimize the risk of washing away the valuable platinum metal compounds; however, in some cases it may be advantageous to impregnate the carrier material when it is in a gelled state.

Yet another essential constituent of the subject composite is the halogen component. Although the precise form of the chemistry of the association of the halogen component with the carrier material is not entirely known, it is customary in the art to refer to the halogen component as being combined with the carrier material or with the other ingredients of the catalyst. This combined halogen may be either fluorine, chlorine, iodine, bromine, or mixtures thereof. Of these, fluorine and, particularly, chlorine are preferred. The halogen may be added to the carrier material in any suitable manner either during preparation of the carrier material or before or after the addition of the other components. For example, the halogen may be added at any stage of the preparation of the carrier material or to the calcined carrier material as an aqueous solution of a decomposable, halogen-containing compound such as hydrogen fluoride, hydrogen chloride, hydrogen bromide, ammonium chloride, ammonium fluoride, etc. The halogen component or a portion thereof may be combined with the carrier material during the impregnation of the latter with the platinum component; for example, through the utilization of a mixture of chloroplatinic acid and hydrogen chloride. In another situation, the alumina hydrosol which is typically utilized to form the preferred alumina carrier material may contain halogen and thus contribute at least a portion of the halogen component to the final composite. For reforming, the halogen is combined with the carrier material in an amount sufficient to result in a final composite that contains about 0.1 to about 3.5 wt. percent, preferably about 0.5 to about 1.5 wt. percent, halogen, calculated on an elemental basis. In isomerization or hydrocracking embodiments, it is generally preferred to utilize relatively larger amounts of halogen in the catalyst—typically ranging up to about 10 wt. percent halogen, calculated on an elemental basis, and, more preferably, about 1.0 to about 5 wt. percent. In a reforming embodiment, the preferred halogen component is chlorine or a compound of chlorine. Good results are obtained when it is fluorine or a compound of fluorine or a mixture of a chlorine component and a fluorine component.

Regarding the amount of the lead component contained in the composite, I have found that it is essential to fix the amount of the lead component as a function of the amount of the platinum component contained in the composite. More specifically, I have observed that the beneficial interaction of the lead component with the platinum component is only obtained when the lead component is present, on an atomic basis, in an amount substantially less than the platinum component. Quantitatively, the amount of the lead component is preferably sufficient to provide an atomic ratio of lead to platinum of about 0.05:1 to about 0.9:1, with best results obtained at an atomic ratio of about 0.1:1 to about 0.75:1. The criticalness associated with this atomic ratio limitation is apparent when an attempt is made to convert hydrocarbons with a catalyst having an atomic ratio of lead to platinum of 1:1. In this latter case, I have observed substantial deactivation of the platinum component by the lead component. Accordingly, it is an essential feature of the present invention that the amount of the lead component is chosen as a function of the amount of the platinum component in order to insure that the atomic ratio of these components in the resulting catalyst is within the stated range. Specific examples of especially preferred catalytic composites are as follows: (1) a catalytic composite comprising 1.0 wt. percent platinum 0.5 wt. percent lead, and 0.5 to 1.5 wt. percent halogen combined with an alumina carrier material, (2) a catalytic composite comprising 0.75 wt. percent platinum, 0.2 wt. percent lead, and 0.5 to 1.5 wt. percent halogen combined with an alumina carrier material, (3) a catalytic composite comprising 0.375 wt. percent platinum, 0.1 wt. percent lead, and 0.5 to 1.5 wt. percent halogen combined with an alumina carrier material, (4) a catalytic composite comprising 0.2 wt. percent platinum, 0.1 wt. percent lead, and 0.5 to 1.5 wt. percent halogen combined with an alumina carrier material, and (5) a catalytic composite comprising 0.5 wt. percent platinum, 0.2 wt. percent lead, and 0.5 to 1.5 wt. percent halogen combined with an alumina carrier material.

Regardless of the details of how the components of the bimetallic catalysts are combined with the porous carrier material, the final catalyst generally will be dried at a temperature of about 200 to about 600° F. for a period of about 2 to about 24 hours or more, and finally calcined or oxidized at a temperature of about 700° F. to about 1100° F. in an air atmosphere for a period of at least about 0.5 to about 10 hours in order to convert substantially all of the metallic components to the oxide form. Best results are generally obtained when the halogen content of the catalyst is adjusted during the oxidation step by including a halogen or a halogen-containing compound in the air atmosphere utilized. In particular, when the halogen component of the catalyst is chlorine, it is preferred to use a mole ratio of $H_2O$ to HCl of about 20:1 to about 100:1 during at least a portion of the calcination step in order to adjust the final chlorine content of the catalyst to a range of about 0.5 to about 1.5 wt. percent.

It is essential that the resultant oxidized catalytic composite be subjected to a reduction step with a substantially water-free reduction agent prior to its use in the conversion of hydrocarbons. This step is designed to selectively reduce the platinum component and to insure a uniform and finely divided dispersion of the metallic components throughout the carrier material. Preferably, substantially pure and dry hydrogen (i.e., less than 20 vol. p.p.m. $H_2O$) is used as the reducing agent in this step. A stream of the reducing agent is contacted with the oxidized catalyst at conditions, including a temperature of about 600° F. to about 1200° F., a gas hourly space velocity of about 100 to 1000 or more hr.$^{-1}$, and for a period of about 0.5 to 10 hours, selected to reduce substantially all of the platinum component to the metallic state while maintaining substantially all of the lead component in an oxidized state. This reduction step may be performed in situ as part of a startup sequence if precautions are taken to predry the plant to a substantially water-free state and if substantially water-free hydrogen is used. Preferably at least the initial portion of the reduction is done slowly (i.e. at lower temperatures) in order to minimize the adverse effects of the water formed by the reduction reaction.

The resulting reduced catalytic composite may, in some cases, be beneficially subjected to a presulfiding step designed to incorporate in the catalytic composite from about 0.05 to about 0.5 wt. percent sulfur calculated on an elemental basis. Preferably, this presulfiding treatment takes place in the presence of hydrogen and a suitable decomposable sulfur-containing compound such as hydrogen sulfide, lower molecular weight mercaptans, organic sulfides, etc. Typically, this procedure comprises treating the reduced catalyst with a sulfiding gas such as a mixture of hydrogen and hydrogen sulfide containing about 10 moles of hydrogen per mole of hydrogen sulfide at conditions sufficient to effect the desired incorporation of sulfur, generally including a temperature ranging from about 50° F. up to about 1000° F. It is generally a good practice to perform this presulfiding step under substantially water-free conditions.

According to the present invention, a hydrocarbon charge stock and hydrogen are contacted with a bimetallic catalyst of the type described above in a hydrocarbon conversion zone. This contacting may be accomplished by using the catalyst in a fixed bed system, a moving bed system, a fluidized bed system, or in a batch type operation; however, in view of the danger of attrition losses of the valuable catalyst and of well known operational advantages, it is preferred to use a fixed bed system. In this system, a hydrogen-rich gas and the charge stock are preheated by any suitable heating means to the desired reaction temperature and then are passed into a conversion zone containing a fixed bed of the catalyst type previously characterized. It is, of course, understood that the conversion zone may be one or more separate reactors with suitable means therebetween to insure that the desired conversion temperature is maintained at the entrance to each reactor. It is also to be noted that the reactants may be contacted with the catalyst bed in either upward, downward, or radial flow fashion with the latter being preferred. In addition, it is to be noted that the reactants may be in a liquid phase, a mixed liquid-vapor phase, or a vapor phase when they contact the catalyst, with best results obtained in the vapor phase.

In the case where the bimetallic catalyst of the present invention is used in a reforming operation, the reforming system will comprise a reforming zone containing a fixed bed of the catalyst type previously characterized. This reforming zone may be one or more separate reactors with suitable heating means therebetween to compensate for the endothermic nature of the reactions that take place in each catalyst bed. The hydrocarbon feed stream that is charged to this reforming system will comprise hydrocarbon fractions containing naphthenes and paraffins that boil within the gasoline range. The preferred charge stocks are those consisting essentially of naphthenes and paraffins, although in many cases aromatics are also present. This preferred class includes straight run gasolines, natural gasolines, synthetic gasolines, and the like. On the other hand, it is frequently advantageous to charge thermally or catalytically cracked gasolines or higher boiling fractions thereof. Mixtures of straight run and cracked gasolines can also be used to advantage. The gasoline charge stock may be a full boiling gasoline having an initial boiling point of from about 50° F. to about 150° F. and an end boiling point within the range of from about 325° F. to about 425° F., or may be a selected fraction thereof which generally will be a higher boiling fraction commonly referred to as a heavy naphtha—for example, a naphtha boiling in the range of $C_7$ to 400° F. In some cases, it is also advantageous to charge pure hydrocarbons or mixtures of hydrocarbons that have been extracted from hydrocarbon distillates—for example, straight chain paraffins—which are to be converted to aromatics. It is preferred that these charge stocks be treated by conventional catalytic pretreatment methods such as hydrorefining, hydrotreating, hydrodesulfurization, etc., to remove substantially all sulfurous, nitrogenous, and water-yielding contaminants therefrom, and to saturate any olefins that may be contained therein.

In other hydrocarbon conversion embodiments, the charge stock will be of the conventional type customarily used for the particular kind of hydrocarbon conversion being effected. For example, in typical isomerization embodiments the charge stock can be a paraffinic stock rich in $C_4$ to $C_8$ normal paraffins, or a normal butane-rich stock, or an n-hexane-rich stock, or a mixture of alkylaromatics such as a mixture of xylenes, etc. In dehydrogenation, the charge stock can be any dehydrogenatable hydrocarbon. In hydrocracking embodiments the charge stock will be typically a gas oil, heavy cracked cycle oil, etc. Likewise, pure hydrocarbons or substantially pure hydrocarbons can be converted to more valuable products by using the bimetallic catalyst of the present invention in any of the hydrocarbon conversion processes known to the art that use a dual-function catalyst.

In a reforming embodiment it is generally preferred to utilize the novel bimetallic catalyst in a reaction environment in which the amount of water present therein is held to carefully controlled levels. Essential to the achievement of this objective is the control of the amount of water, or its equivalent, present in the charge stock and in the hydrogen stream which are passed to the reforming zone. Best results are ordinarily obtained when the total amount of water or water-producing compounds entering the reforming zone from any source is held to a level in the range corresponding to about 5 to about 50 wt. p.p.m., expressed as weight of equivalent water in the charge stock. When the amount of water entering this zone is above this preferred range, a significant reduction in water level can be accomplished by careful control of the water present in the charge stock and/or in the hydrogen stream. The charge stock and/or the hydrogen stream can be dried by using any suitable drying means known to those skilled in the art such as conventional solid adsorbents having a high selectivity for water; for instance, sodium or calcium crystalline aluminosilicate, silica gel, activated alumina, molecular sieves, anhydrous calcium sulfate, high surface area sodium, and the like adsorbents. Similarly, the water content of the charge stock may be adjusted by a conventional water-stripping operation in a fractionating column or like devices. And, in some cases, a combination of adsorbent drying and distillation drying may be beneficially used to effect almost complete removal of water from the charge stock. In the case where the total amount of water or water-producing substances entering the reforming zone is below the desired range, the required amount of water can be achieved by introducing into the reforming zone in any manner a suitable water additive such as water per se or an oxygen-containing substance that is reducible to water at catalytic reforming conditions. Typical oxygen-containing reducible compounds that may be utilized are the alcohol, the aldehydes, the ketones and the like.

In the reforming embodiment, an effluent stream is withdrawn from the reforming zone and passed through a cooling means to a separation zone, typically maintained at about 25 to 150° F. wherein a hydrogen-rich gas is separated from a high octane liquid product, commonly called an unstabilized reformate. This hydrogen-rich gas is withdrawn from the separating zone, and when the water level in the reforming zone is too high, at least a portion thereof passed through an adsorption zone containing an adsorbent selective for water. A major portion of this hydrogen-rich gas stream, plus the dried hydrogen stream when drying is used, is then recycled through suitable compressing means back to the reforming zone. The liquid phase from the separating zone is then typically withdrawn and commonly treated in a fractionating system in order to adjust its butane concentration in order to control front-end volatility of the resulting reformate.

The conditions utilized in the numerous hydrocarbon conversion embodiments of the present invention are those customarily used in the art for the particular reaction or combination of reactions that is to be effected. For instance, alkylaromatic and paraffin isomerization conditions include: a temperature of about 32° to about 1000° F. and preferably about 75 to about 600° F.; a pressure of atmospheric to about 100 atmospheres; hydrogen to hydrocarbon mole ratio of about 0.5 to about 20:1 and an LHSV (calculated on the basis of equivalent liquid volume of the charge stock contacted with the catalyst per hour divided by the volume of conversion zone containing catalyst) of about 0.2 hr.$^{-1}$ to 10 hr.$^{-1}$. Dehydrogenation conditions include: a temperature of about 700 to about 1250° F., a pressure of about 0.1 to about 10 atmospheres, a liquid hourly space velocity of about 1 to 40 hr.$^{-1}$ and a hydrogen to hydrocarbon mole ratio of about 1:1 to 20:1. Likewise, typically hydrocracking conditions include: a pressure of about 500 p.s.i.g. to about 3000 p.s.i.g.; a temperature of about 400° F. to about 900° F.; an LHSV of about 0.1 hr.$^{-1}$ to about 10 hr.$^{-1}$; and hydrogen circulation rates of about 1000 to 10,000 s.c.f. per barrel of charge.

In the reforming embodiment of the present invention, the pressure utilized is preferably selected in the range of about 0 p.s.i.g. to about 1000 p.s.i.g., with best results obtained at about 50 to about 350 p.s.i.g. In fact, it is a singular advantage of the present invention that it allows stable operation at lower pressure than have heretofore been successfully utilized in so-called "continuous" reforming systems (i.e., reforming for periods of about 15 to about 200 or more barrels of charge per pound of catalyst without regeneration). In other words, the bimetallic catalyst of the present invention allows the operation of a continuous reforming system to be conducted at lower pressure (i.e., 50 to 350 p.s.i.g.) for about the same or better catalyst life before regeneration as has been heretofore realized with conventional catalysts at higher pressures (i.e., 400 to 600 p.s.i.g.).

Similarly, the temperature required for reforming is generally lower than that required for a similar reforming operation using a high quality catalyst of the prior art. This significant and desirable feature of the present invention is a consequence of the selectivity of the catalyst of the present invention for the octane-upgrading reactions that are preferably induced in a typical reforming operation. Hence, the present invention requires a temperature in the range of from about 800° F. to about 1100° F. and preferably about 900° F. to about 1050° F. As is well known to those skilled in the continuous reforming art, the initial selection of the temperature within this broad range is made primarily as a function of the desired octane of the product reformate considering the characteristics of the charge stock and of the catalyst. Ordinarily, the temperature then is thereafter slowly increased during the run to compensate for the inevitable deactivation that occurs to provide a constant octane product. Therefore, it is a feature of the present invention that the rate at which the temperature is increased in order to maintain a constant octane product, is subsanttially lower for the bimetallic catalyst of the present invention than for a high quality reforming catalyst which is manufactured in exactly the same manner as the catalyst of the present invention except for the inclusion of the lead component. Moreover, for the catalyst of the present invention, the $C_5^+$ yield loss for a given temperature increase is substantially lower than for a high quality reforming catalyst of the prior art. In addition, hydrogen production is substantially higher.

The reforming embodiment of the present invention also typically utilizes sufficient hydrogen to provide an amount of about 2 to about 20 moles of hydrogen per mole of hydrogen entering the reforming zone, with excellent results being obtained when about 5 to about 10 moles of hydrogen are used per mole of hydrocarbon. Likewise, the liquid hourly space velocity (LHSV) used in reforming is selected from the range of about 0.1 to about 10 hr.$^{-1}$ with a value in the range of about 1 to about 5 hr.$^{-1}$ being preferred. In fact, it is a feature of the present invention that, for the same severity level, it allows operations to be conducted at higher LHSV than normally can be stably achieved in a continuous reforming process with a high quality reforming catalyst of the prior art. This last feature is of immense economic significance because it allows a continuous reforming process to operate at the same throughput level with less catalyst inventory than that heretofore used with conventional reforming catalysts at no sacrifice in catalyst life before regeneration.

The following examples are given to illustrate further the preparation of the catalytic composite of the present invention and the use thereof in the conversion of hydrocarbons. It is understood that the examples are given for the sole purpose of illustration and are not to be considered to limit unduly the generally broad scope and spirit of the appended claims.

EXAMPLE I

This example demonstrates a preferred method of preparing the bimetallic catalytic composite of the present invention.

An alumina carrier material comprising $\frac{1}{16}$ inch spheres was prepared by: forming an aluminum hydroxyl chloride sol by dissolving substantially pure aluminum pellets in a hydrochloric acid solution, adding hexamethylenetetramine to the resulting sol, gelling the resulting solution by dropping it into an oil bath to form spherical particles of alumina hydrogel. The resulting hydrogel particles were then aged and washed with an ammoniacal solution and finally dried and calcined at an elevated temperature to form spherical particles of gamma-alumina containing about 0.3 wt. percent combined chloride. Additional details as to this method of preparing the preferred carrier material are given in the teachings of U.S. Pat. No. 2,620,314.

The resulting gamma-alumina particles were then contacted with an impregnation solution containing chloroplatinic acid and lead nitrate in an amount sufficient to result in a final composite containing 0.375 wt. percent platinum and 0.1 wt. percent lead, calculated on an elemental basis. In addition, the impregnation solution contained nitric acid in an amount equivalent to about 3 wt. percent of the alumina particles. In order to insure uniform distribution of both metallic components throughout the carrier material, this impregnation step was performed by adding the carrier material particles to the impregnation mixture with constant agitation. In addition, the volume of the solution was about equal to the volume of the carrier material particles. The impregnation mixture was maintained in contact with the carrier material particles for a period of about ½ hour at a temperature of about 70° F. Thereafter, the temperature of the impregnation mixture was raised to about 225° F. and the excess solution was evaporated in a period of about 1 hour. The resulting dried particles were then subjected to a calcination treatment in an air atmosphere at a temperature of about 925° F. for about 1 hour. The calcined spheres were then contacted with an air stream containing $H_2O$ and $HCl$ in a mole ratio of about 40:1 for about 4 hours at 975° F. in order to adjust the halogen content of the catalyst particles to a value of about 0.90.

The resulting catalyst particles were analyzed and found to contain, on an elemental basis, about 0.375 wt. percent platinum, about 0.1 wt. percent lead, and about 0.85 wt. percent chloride. On an atomic basis, the ratio of lead to platinum was 0.25:1.

Thereafter, the catalyst particles were subjected to a dry pre-reduction treatment by contacting them with a substantially pure hydrogen stream containing less than 20 vol. p.p.m. $H_2O$ at a temperature of about 1000° F., a pressure slightly above atmospheric and a flow rate of the hydrogen stream through the catalyst particles corresponding to a gas hourly space velocity of about 720 hr.$^{-1}$ This pre-reduction step was for a duration of about 1 hour.

EXAMPLE II

In order to compare the novel catalytic composite of the present invention with those of the prior art in a manner calculated to bring out the interaction between the lead component and the platinum component, a comparison test was made between the catalyst of the present invention which was prepared according to the method given in Example I and a reforming catalyst of the prior art which contained platinum as its sole hydrogenation-dehydrogenation component. That is, the control catalyst was a combination of platinum and chlorine with a gamma-alumina carrier material which was prepared by a manner analogous to that given in Example I except for the inclusion of the lead component and contained, on an elemental basis, about 0.75 wt. percent platinum and about 0.85 wt. percent chlorine.

These catalysts were then separately subjected to a high stress evaluation test designed to determine their relative activity and selectivity for the reforming of a gasoline charge stock. In all tests the same charge stock was utilized, its characteristics are given in Table I. It is to be noted that this test is conducted under a substantially water-free condition with the only significant source of water being the 5.9 wt. p.p.m. present in the charge stock.

TABLE I.—ANALYSIS OF HEAVY KUWAIT NAPHTHA

| | |
|---|---|
| API gravity at 60° F. | 60.4 |
| Initial boiling point, ° F. | 184 |
| 10% boiling point, ° F. | 205 |
| 50% boiling point, ° F. | 256 |
| 90% boiling point, ° F. | 321 |
| End boiling point, ° F. | 360 |
| Sulfur, wt. p.p.m. | 0.5 |
| Nitrogen, wt. p.p.m. | 0.1 |
| Aromatics, vol. percent | 8 |
| Paraffins, vol. percent | 71 |
| Naphthenes, vol. percent | 21 |
| Water, p.p.m. | 5.9 |
| Octane No., F-1 clear | 40.0 |

This test was specifically designed to determine in a very short time period whether the catalyst being evaluated has superior characteristics for the reforming process. It consists of 6 periods each consisting of a 10 hour test period run at a constant temperature during which time a $C_5^+$ product reformate is collected. It was performed in a laboratory scale reforming plant comprising a reactor containing the catalyst, hydrogen separation zone, a debutanizer column, suitable heating, pumping, and condensing means, etc.

In this plant, a hydrogen recycle stream and the charge stock are commingled and heated to the desired conversion temperature. The resulting mixture is then passed downflow into a reactor containing the catalyst as a fixed bed. An effluent stream is then withdrawn from the bottom of the reactor, cooled to about 55° F., and passed to the separating zone wherein a hydrogen-rich gaseous phase separates from a liquid phase. A portion of the gaseous phase is continuously passed through a high surface area sodium scrubber and the resulting substantially water-free hydrogen stream recycled to the reactor in order to supply hydrogen for the reaction, and the excess over that needed for plant pressure is recovered as excess separator gas. Moreover, the liquid phase from the separating zone is withdrawn therefrom and passed to the debutanizer column wherein light ends are taken overhead as debutanizer gas and a $C_5^+$ reformate stream recovered as bottoms.

Conditions utilized in this test are: a constant temperature of about 970° F. for the first three periods followed by a constant temperature of about 1000° F. for the last three periods, a liquid hourly space velocity of 3.0 hr.$^{-1}$, an outlet pressure of the reactor of 100 p.s.i.g., and a mole ratio of hydrogen to hydrocarbon entering the reactor of 8:1. This two temperature test is designed to quickly and efficiently yield two points on the yield-octane curve for the particular catalysts. The conditions utilized are selected on the basis of experience to yield the maximum amount of information on the capability of the catalyst being tested to respond to a high severity operation.

The results of the separate tests performed on the catalyst of the present invention and the control catalyst are presented for each test period in Table II in terms of inlet temperature to the reactor in ° F., net excess separator gas in standard cubic feet per barrel of charge (s.c.f./bbl.), debutanizer overhead gas in standard cubic feet per barrel, the ratio of the debutanizer gas make to the total gas make, and F-1 clear octane number.

In addition, the respective catalysts were analyzed for carbon content after the completion of test. The results showed that the catalyst of the present invention contained 3.09 wt. percent carbon which was in marked contrast to the 4.17 wt. percent carbon which was found on the control catalyst. These results evidence an additional advantage of the present invention which is the capability to suppress the rate of deposition of carbonaceous materials thereon during the course of the reforming reaction.

Referring now to the results of the separate tests presented in Table II, it is evident that the primary effect of the lead component on the catalyst is to substantially promote the platinum metal component and to enable a catalyst containing less platinum to out-perform a catalyst containing a substantially greater amount of platinum. That is, the catalyst of the present invention is sharply superior to the control catalyst in both activity and selectivity. As was pointed out hereinbefore, a good measure of activity for a reforming catalyst is octane number of reformate producted at the same conditions; on this basis, the catalyst of the present invention was more active than the control catalyst at both temperature conditions. However, activity is only half of the story: activity must be coupled with selectivity to demonstrate superiority. Selectivity is measured directly by reference to $C_5^+$ yield and indirectly by reference to separator gas make, which is roughly proportional to net hydrogen make which, in turn, is a product of the preferred upgrading reactions, and by reference to debutanizer gas make which is a rough measure of undesired hydrocracking and should be minimized for a highly selective catalyst. Referring again to the data presented in Table II and using the selectivity criteria, it is manifest that the catalyst of the present invention is materially more selective than the control catalyst.

From the consideration of this data, it is clear that lead can be an efficient and effective promoter of a platinum metal reforming catalyst.

EXAMPLE III

In order to study the responses of the present bimetallic catalyst to varying conditions in a reforming operation, a sample of the catalyst prepared by the method of Example I was subjected to a 4 period test in which the pressure, the liquid hourly space velocity, and the conversion temperature were varied in a manner calculated to bring out the resopnses of the catalyst to changes in pressure and changes in space velocity. The charge stock and reforming plant structure were identical to those described in Example II.

After a line-out period of 12 hours, a 4 period test was performed. The test periods were of 10 hour duration followed by a 10 hour line-out period, and the conditions used in each period were as follows: for the first period the pressure was 500 p.s.i.g., the liquid hourly space velocity was 1.5 hr.$^{-1}$ and the conversion temperature was 975° F.; for the second period the pressure was 300 p.s.i.g., the liquid hourly space velocity was 1.5 hr.$^{-1}$, and the temperature was 975° F.; for the third period the pressure was 300 p.s.i.g., the liquid hourly space velocity was 3.0 hr.$^{-1}$, and the conversion temperature was 1020° F.; and for the final period the pressure was 100 p.s.i.g., the liquid hourly space velocity was 3.0 hr.$^{-1}$, and the temperature was 1050° F.

The results of this test for the catalyst of the present invention and the control catalyst are presented in Table III in terms of: octane number of $C_5^+$ product, debutanizer gas make in s.c.f./bbl., net separator gas in s.c.f./bbl., and ratio of debutanizer gas make to total gas make.

TABLE II.—RESULTS OF ACCELERATED REFORMING TESTS

| Period number | T, ° F. | Separator gas, s.c.f./bbl. | Debutanizer gas, s.c.f./bbl. | Debutanizer gas/total gas ratio | Octane No., F-1, clear |
|---|---|---|---|---|---|
| Catalyst of the present invention—0.375 wt. percent, Pt, 0.1 wt. percent Pb, and 0.85 wt. percent Cl | | | | | |
| 1 | 963 | 1,430 | 59 | .040 | 95.5 |
| 2 | 963 | 1,387 | 51 | .036 | 94.5 |
| 3 | 963 | 1,359 | 52 | .037 | 94.4 |
| 4 | 997 | 1,581 | 59 | .036 | 98.8 |
| 5 | 997 | 1,531 | 60 | .038 | 97.9 |
| 6 | 997 | 1,483 | 59 | .038 | 96.6 |
| Control catalyst—0.75 wt. percent Pt and 0.85 wt. percent Cl | | | | | |
| 1 | 963 | 1,307 | 66 | .048 | 91.4 |
| 2 | 963 | 1,236 | 63 | .049 | 89.5 |
| 3 | 963 | 1,196 | 66 | .052 | 88.9 |
| 4 | 997 | 1,377 | 82 | .056 | 94.0 |
| 5 | 997 | 1,343 | 86 | .060 | 93.3 |
| 6 | 997 | 1,303 | 87 | .062 | 92.3 |

TABLE III.—RESULTS OF CONDITION STUDY

| Period number | T, ° F. | LHSV, hr.$^{-1}$ | P, p.s.i.g. | Debut./total gas ratio | O.N., F-1, clear | DGas, s.c.f./bbl. | SGas, s.c.f./bbl. |
|---|---|---|---|---|---|---|---|
| Catalyst of the present invention—0.375 wt. percent Pt, 0.1 wt. percent Pb, and 0.85 wt. percent Cl | | | | | | | |
| 1 | 975 | 1.5 | 500 | .309 | 98.8 | 405 | 906 |
| 2 | 975 | 1.5 | 300 | .164 | 99.5 | 252 | 1,284 |
| 3 | 1,020 | 3.0 | 300 | .151 | 99.3 | 236 | 1,326 |
| 4 | 1,050 | 3.0 | 100 | .045 | 100.9 | 79 | 1,693 |
| Control catalyst—0.75 wt. percent Pt and 0.85 wt. percent Cl | | | | | | | |
| 1 | 975 | 1.5 | 500 | .282 | 98.9 | 387 | 985 |
| 2 | 975 | 1.5 | 300 | .151 | 98.8 | 225 | 1,262 |
| 3 | 1,020 | 3.0 | 300 | .155 | 97.9 | 223 | 1,221 |
| 4 | 1,050 | 3.0 | 100 | .087 | 94.9 | 118 | 1,233 |

By reference to the data presented in Table III, it can be seen that the catalyst of the present invention quite unexpectedly exhibits markedly superior performance at the low pressure conditions utilized. These results stand in sharp contrast to the generally poor performance of the all platinum metal-containing control catalyst.

Accordingly, the bimetallic catalyst of the present invention in a reforming embodiment finds optimum application at a low pressure condition of about 50 to about 350 p.s.i.g. This superior performance in the low pressure domain is not paralleled by superior performance at high pressure conditions, and this response of the catalysts of the present invention to low pressure conditions is one of the singular and totally unexpected advantages associated with the catalyst of the present invention.

It is intended to cover by the following claims all changes and modifications of the above disclosure of the present invention that would be selff-evident to a man of ordinary skill in the catalyst formulation art.

I claim as my invention:

1. A catalytic composite consisting essentially of a porous carrier material, about 0.01 to about 2 wt. percent elemental platinum metal, about 0.1 to about 3.5 wt. percent halogen, and lead in the form of the oxide, sulfide or halide and in an oxidation state above that of the elemental metal and in an amount corresponding to an atomic ratio of lead to platinum in the range of from about 0.05:1 to 0.9:1, the lead and platinum being uniformly dispersed throughout the porous carrier material.

2. A catalytic composite as defined in claim 1 wherein said porous material is a refractory inorganic oxide.

3. A catalytic composite as defined in claim 2 wherein said refractory inorganic oxide is alumina.

4. A catalytic composite as defined in claim 1 wherein the halogen is chlorine.

5. A catalytic composite as defined in claim 1 wherein the halogen is fluorine.

6. A catalytic composite as defined in claim 1 wherein the lead is present in an amount corresponding to an atomic ratio of lead to platinum selected from the range of about 0.1:1 to about 0.75:1.

7. A catalytic composite as defined in claim 1 containing 0.05 to about 0.5 wt. percent sulfur.

8. A catalytic composite as defined in claim 1 wherein the composite contains about 0.05 to about 1 wt. percent platinum metal.

9. A catalytic composite as defined in claim 1 wherein the composite contains about 0.5 to about 1.5 wt. percent halogen.

10. A catalytic composite as defined in claim 1 wherein the lead is in the form of lead oxide.

References Cited
UNITED STATES PATENTS

| | | | |
|---|---|---|---|
| 3,630,961 | 12/1971 | Wilhelm | 252—442 |
| 3,425,792 | 2/1969 | Stephens | 252—446 J X |
| 3,278,608 | 10/1966 | Clement | 252—466 PT X |
| 2,500,146 | 3/1950 | Fleck et al. | 208—138 X |
| 2,441,297 | 5/1948 | Stirton | 260—673.5 X |
| 3,649,565 | 3/1972 | Wilhelm | 252—466 PT |
| 3,660,309 | 5/1972 | Hayes et al. | 252—442 |
| 3,686,340 | 8/1972 | Patrick et al. | 208—138 |
| 3,700,588 | 10/1972 | Weisang et al. | 252—442 |

PATRICK P. GARVIN, Primary Examiner

U.S. Cl. X.R.

208—139; 252—441, 442